United States Patent
Irie et al.

(10) Patent No.: US 9,618,645 B2
(45) Date of Patent: Apr. 11, 2017

(54) METAL DETECTION DEVICE USING HARMONIC LEVEL DETECTION

(71) Applicant: Panasonic Corporation, Osaka (JP)

(72) Inventors: Kenichi Irie, Osaka (JP); Masashi Kawada, Shizuoka (JP); Satoshi Hyodo, Hyogo (JP); Hiroshi Kohara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 166 days.

(21) Appl. No.: 14/382,975

(22) PCT Filed: Feb. 28, 2013

(86) PCT No.: PCT/JP2013/001230
§ 371 (c)(1),
(2) Date: Sep. 4, 2014

(87) PCT Pub. No.: WO2013/132800
PCT Pub. Date: Sep. 12, 2013

(65) Prior Publication Data
US 2015/0028875 A1    Jan. 29, 2015

(30) Foreign Application Priority Data

Mar. 9, 2012 (JP) .................... 2012-053326

(51) Int. Cl.
*G01V 3/10* (2006.01)
*H02J 5/00* (2016.01)
(Continued)

(52) U.S. Cl.
CPC ............... *G01V 3/10* (2013.01); *H01F 38/14* (2013.01); *H02J 5/005* (2013.01); *H04B 5/0037* (2013.01)

(58) Field of Classification Search
CPC . G01V 3/10; H01F 38/14; H02J 5/005; H04B 5/0037
(Continued)

(56) References Cited

U.S. PATENT DOCUMENTS 5,498,958 A * 3/1996 Tu ..................... H03K 17/9525
324/207.16
5,684,583 A * 11/1997 Abe ..................... G01N 15/1456
356/335
(Continued)

FOREIGN PATENT DOCUMENTS

CH   WO 2011141672 A1 * 11/2011 ............. G01V 3/105
CN          102230914 A    11/2011
(Continued)

OTHER PUBLICATIONS

Extended European Search Report dated Dec. 4, 2015 for corresponding European Application No. 13758119.5.
(Continued)

*Primary Examiner* — Jay Pitidar
(74) *Attorney, Agent, or Firm* — Renner, Otto, Boisselle & Sklar, LLP

(57) ABSTRACT

A metal detection device includes a metal detection coil arranged in a metal detection area, wherein the metal detection coil is excited, and an electromagnetic wave radiated from the metal detection coil detects whether metal exists in the metal detection area. An oscillation circuit generates a sinusoidal oscillating current having a single fundamental frequency and supplies the oscillating current to the metal detection coil to excite the coil. A harmonic level detection circuit detects a harmonic component of the fundamental frequency component of the oscillating current and generates a detection signal. A comparison circuit compares a signal level of the detection signal and a pre-set reference value. A processing circuit determines whether metal exists
(Continued)

in the metal detection area based on a comparison result. When determining that metal exists in the metal detection area, the processing circuit drives a notification unit to issue a notification indicating detection of metal.

4 Claims, 8 Drawing Sheets

(51) Int. Cl.
  *H01F 38/14* (2006.01)
  *H04B 5/00* (2006.01)
(58) Field of Classification Search
  USPC .......................................... 324/67, 326–329
  See application file for complete search history.

(56) References Cited

U.S. PATENT DOCUMENTS

| 2008/0197712 | A1 | 8/2008 | Jin et al. |
| 2011/0074401 | A1* | 3/2011 | Moskalenko .......... G01N 33/02 324/233 |
| 2011/0285210 | A1 | 11/2011 | Lemmens et al. |
| 2011/0291491 | A1 | 12/2011 | Lemmens et al. |
| 2012/0001493 | A1 | 1/2012 | Kudo et al. |
| 2012/0175967 | A1 | 7/2012 | Dibben et al. |
| 2013/0064635 | A1* | 3/2013 | Kirchdoerffer ........ G01V 3/105 414/752.1 |
| 2013/0099592 | A1 | 4/2013 | Abe |
| 2014/0001881 | A1 | 1/2014 | Murakami et al. |

FOREIGN PATENT DOCUMENTS

| JP | 07-185176 A | | 7/1995 |
| JP | 10228523 A | * | 8/1998 |
| JP | 2000-295796 A | | 10/2000 |
| JP | 2008-237006 A | | 10/2008 |
| JP | 2010-216863 A | | 9/2010 |
| JP | 2011-507481 A | | 3/2011 |
| JP | 2012-016125 A | | 1/2012 |
| JP | 2012-034447 A | | 2/2012 |
| WO | WO 2009/081115 A1 | | 7/2009 |
| WO | WO 2012/132818 A1 | | 10/2012 |

OTHER PUBLICATIONS

International Preliminary Report on Patentability for corresponding International Application No. PCT/JP2013/001230 issued Sep. 9, 2014.
International Search Report for corresponding International Application No. PCT/JP2013/001230 mailed on Jun. 4, 2013.

* cited by examiner

METAL DETECTION DEVICE USING HARMONIC LEVEL DETECTION

TECHNICAL FIELD

The present invention relates to a metal detection method, a metal detection device, a metal detection method for a contactless power supplying device, and a contactless power supplying device.

BACKGROUND ART

Conventionally, an electromagnetic induction type contactless power transmission device includes a metal detection device. When a metal is placed on a setting surface, the metal detection device prevents the metal from being inductively heated when supplying power to an electric instrument.

For example, in patent document 1, a metal detection device is a frequency following circuit that searches for a resonance frequency to determine whether (1) nothing is placed on the setting surface, (2) a power receiving circuit is correctly placed on the setting surface, and (3) a foreign object of metal or the like is placed on the setting surface.

In patent document 2, a metal detection device monitors changes in the amplitude of a coil voltage caused by load modulation to detect a foreign object of metal or the like.

Furthermore, in patent document 3, a metal detection device changes a signal applied to a primary coil between two intensities and monitors the power consumed at the primary side to check whether a foreign object exists on the setting surface.

PRIOR ART DOCUMENTS

Patent Documents

Patent Document 1: Japanese Laid-Open Patent Publication No. 2000-295796
Patent Document 2: Japanese Laid-Open Patent Publication No. 2008-237006
Patent Document 3: Japanese Laid-Open Patent Publication No. 2011-507481

SUMMARY OF THE INVENTION

In patent document 1, if metal is sandwiched between the power supplying circuit and the correct power receiving circuit, a strong influence resulting from the arrangement of the correct power receiving circuit makes it difficult to determination whether or not metal exists. That is, since the difference between the frequency of when a metal is placed and the frequency of when a correct power receiving circuit is placed is small, it is difficult to detect the metal sandwiched between the power supplying circuit and the correct power receiving circuit.

In patent document 2, since load modulation is performed, secondary instrument is needed. Therefore, metal cannot be detected if the metal is placed on only the primary side. Furthermore, when detecting metal based on changes in the amplitude caused by the load modulation, if the metal is very small or very thin, changes in the amplitude value would be small making it difficult to detect the metal.

In patent document 3, changes in the intensity of a fundamental wave are monitored. Thus, the amount of change in the fundamental wave is very small with respect to a metal. This makes the determination difficult. Furthermore, since the signal intensity is changed between two levels, two power supplies are required. This is disadvantageous in terms of cost and size.

Furthermore, in recent years, contactless power supplying device have become popular, and the range of the field and usage environment of the subject supplied with power by the contactless power supplying device has become wide. Thus, there is a demand for a new metal detection method, other than the methods described above, having high accuracy and unaffected by the usage environment.

For example, a new type of metal detection method and a detection device thereof are desired for a metal detection device that detects in a contactless manner whether an object is a metal or a non-metal such as a synthetic resin.

It is an object of the present invention to provide a metal detection method, a metal detection device, a metal detection method for a contactless power supplying device, and a contactless power supplying device that accurately detect whether an object is metal or non-metal.

Means for Solving the Problems

To achieve the above object, a metal detection method according to the present invention excites a metal detection coil arranged in a metal detection area to use an electromagnetic wave radiated from the metal detection coil and detect whether or not metal exists in the metal detection area. The method includes exciting the metal detection coil with a sinusoidal oscillating current having a single fundamental frequency to radiate an electromagnetic wave from the metal detection coil, and detecting whether or not metal exists in the metal detection area from a change in the fundamental frequency in the oscillating current flowing to the metal detection coil.

Preferably, in the above configuration, the detecting whether or not metal exists in the metal detection area includes detecting that metal exists in the metal detection area when a harmonic of the fundamental frequency is generated in the oscillating current.

To achieve the above object, a metal detection device includes a metal detection coil arranged in a metal detection area. The metal detection coil is excited, and an electromagnetic wave radiated from the metal detection coil is used to detect whether or not metal exists in the metal detection area. An oscillation circuit generates a sinusoidal oscillating current having a single fundamental frequency. The oscillation circuit supplies the oscillating current to the metal detection coil to excite the metal detection coil. A harmonic level detection circuit detects a harmonic component of the fundamental frequency component of the oscillating current and generates a detection signal. A comparison circuit compares a signal level of the detection signal and a reference value, which is set in advance. A processing circuit determines whether or not metal exists in the metal detection area based on a comparison result. When determining that metal exists in the metal detection area, the processing circuit drives a notification unit to issue a notification indicating detection of metal.

Preferably, in the above configuration, the harmonic level detection circuit includes a filter circuit, which filters a frequency component higher than the fundamental frequency from the oscillating current to generate a filtered signal, and an amplification circuit, which amplifies the filtered signal from the filter circuit to generate the detection signal.

Preferably, in the above configuration, the harmonic level detection circuit includes a high speed Fourier transformation circuit that extracts a frequency component higher than the fundamental frequency from the oscillating current to generate the detection signal.

Preferably, in the above configuration, the notification unit includes an indication lamp.

To achieve the above object, a metal detection method of a contactless power supplying device according to the present invention uses a contactless power supplying device including a primary coil arranged in a power supplying area. When an electric instrument is placed in the power supplying area, the contactless power supplying device excites the primary coil arranged in the power supplying area to cause electromagnetic induction at a secondary coil of a power receiving device arranged in the electric instrument and supply power to the electric instrument. The contactless power supplying device includes a metal detection coil arranged in the power supplying area. The metal detection method includes exciting the metal detection coil with a sinusoidal oscillating current having a single fundamental frequency to radiate an electromagnetic wave from the metal detection coil, and detecting whether or not metal exists in the power supplying area from a change in a fundamental frequency of the oscillating current flowing to the metal detection coil.

Preferably, in the above configuration, the detecting whether or not metal exists in the power supplying area includes detecting that metal exists in the power supplying area when a harmonic of the fundamental frequency is generated in the oscillating current.

To achieve the above object, a contactless power supplying device according to the present invention arranges a primary coil in a power supplying area. When an electric instrument is placed in the power supplying area, the primary coil arranged in the power supplying area is excited to cause electromagnetic induction at a secondary coil of a power receiving device arranged in the electric instrument to supply power to the electric instrument. A metal detection coil is arranged in the power supplying area. An oscillation circuit generates a sinusoidal oscillating current having a single fundamental frequency and supplies the oscillating current to the metal detection coil to excite the metal detection coil. A harmonic level detection circuit detects a harmonic component of the fundamental frequency component of the oscillating current and generates a detection signal. A comparison circuit compares a signal level of the detection signal and a reference value, which is set in advance. A control circuit determines whether or not metal exists in the power supplying area based on a comparison result. When determining that metal exists in the power supplying area, the control circuit causes the oscillation circuit to stop the excitation of the metal detection coil.

Preferably, in the above configuration, the harmonic level detection circuit includes a filter circuit that filters a frequency component higher than the fundamental frequency from the oscillating current to generate a filtered signal, and an amplification circuit that amplifies the filtered signal from the filter circuit and generates the detection signal.

Preferably, in the above configuration, the harmonic level detection circuit includes a high speed Fourier transformation circuit that extracts a frequency component higher than the fundamental frequency from the oscillating current and generates the detection signal.

Preferably, in the above configuration, the power supplying area is one of a plurality of separate power supplying areas. The primary coil is one of a plurality of primary coils respectively arranged in the plurality of power supplying areas. The metal detection coil is one of a plurality of metal detection coils respectively arranged in the plurality of power supplying areas. The oscillation circuit is one of a plurality of oscillation circuits respectively arranged in the plurality of power supplying areas. The harmonic level detection circuit is one of a plurality of harmonic level detection circuits respectively arranged in the plurality of power supplying areas. The comparison circuit is one of a plurality of comparison circuits respectively arranged in the plurality of power supplying areas. The contactless power supplying device includes a plurality of metal detection circuits respectively arranged in the plurality of power supplying areas. Each of the plurality of metal detection circuits includes the oscillation circuit, the harmonic level detection circuit, and the comparison circuit, and is controlled by the control circuit.

Preferably, the above configuration includes a notification unit that indicates whether or not metal exists in the power supplying area. The control circuit drives the notification unit based on a comparison result of the comparison circuit.

Preferably, in the above configuration, the notification unit includes an indication lamp.

To achieve the above object, a metal detection method using a contactless power supplying device according to the present invention includes a primary coil arranged in a power supplying area. When an electric instrument is placed in the power supplying area, the contactless power supplying device excites a primary coil arranged in the power supplying area and causes electromagnetic induction at a secondary coil of a power receiving device arranged in the electric instrument to supply power to the electric instrument. The metal detection method includes exciting the primary coil with a sinusoidal oscillating current having a single fundamental frequency to radiate an electromagnetic wave from the primary coil, and detecting whether or not metal exists in the power supplying area from a change in a fundamental frequency of the oscillating current flowing to the primary coil.

Preferably, in the above configuration, the detecting whether or not metal exists in the power supplying area includes detecting that metal exists in the power supplying area when a harmonic of the fundamental frequency is generated in the oscillating current.

To achieve the above object, a contactless power supplying device according to the present invention includes a primary coil arranged in a power supplying area. When an electric instrument is placed in the power supplying area, the primary coil arranged in the power supplying area is excited to cause electromagnetic induction in a secondary coil of a power receiving device arranged in the electric instrument to supply power to the electric instrument. An excitation circuit generates a sinusoidal oscillating current having a single fundamental frequency and supplies the oscillating current to the primary coil to excite the primary coil. A harmonic level detection circuit detects a harmonic component of the fundamental frequency component of the oscillating current to generate a detection signal. A comparison circuit compares a signal level of the detection signal with a reference value, which is set in advance. A processing circuit determines whether or not metal exists in the power supplying area based on a comparison result. When determining that metal exists in the power supplying area, the processing circuit drives a notification unit to issue a notification indicating detection of metal.

Preferably, in the above configuration, the harmonic level detection circuit includes a filter circuit that filters a frequency component higher than the fundamental frequency from the oscillating current and generates a filtered signal.

An amplification circuit amplifies the filtered signal from the filter circuit and generates the detection signal.

Preferably, in the above configuration, the harmonic level detection circuit includes a high speed Fourier transformation circuit that extracts a frequency component higher than the fundamental frequency from the oscillating current and generates the detection signal.

Preferably, in the above configuration, the notification unit includes at least one of an indication lamp and a buzzer.

Effect of the Invention

The present invention accurately detects a metal and a non-metal.

EMBODIMENTS OF THE INVENTION

First Embodiment

A metal detection device according to a first embodiment of the present invention will now be described with reference to the drawings.

Figure 1:
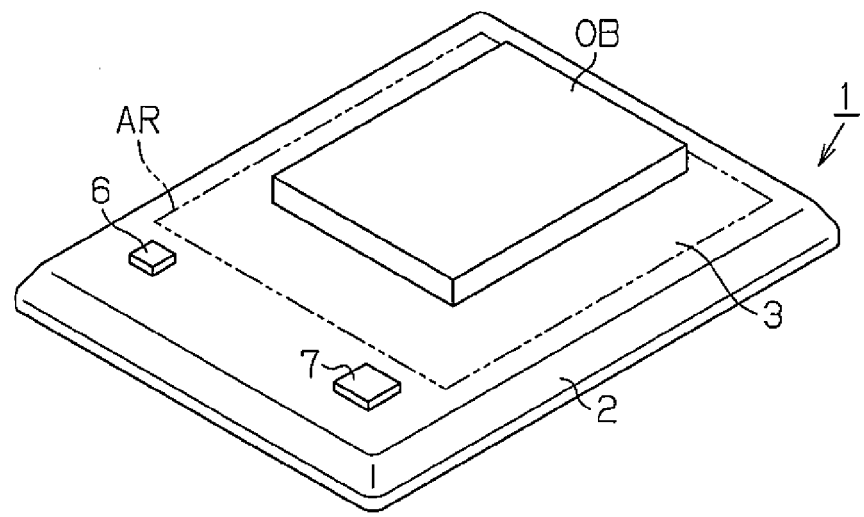
FIG. 1 is a perspective view entirely showing a metal detection device of a first embodiment.

As shown in FIG. 1, a metal detection device 1 includes a tetragonal plate-shaped housing 2, and a planar setting surface 3, which is formed on an upper surface of the housing 2 and on which an object OB is placed. A single tetragonal detection area AR is defined in the setting surface 3. The metal detection device 1 detects, in a contactless manner, whether the object OB placed on the setting surface 3 is a metal or a non-metal such as a synthetic resin or the like.

Figure 2:
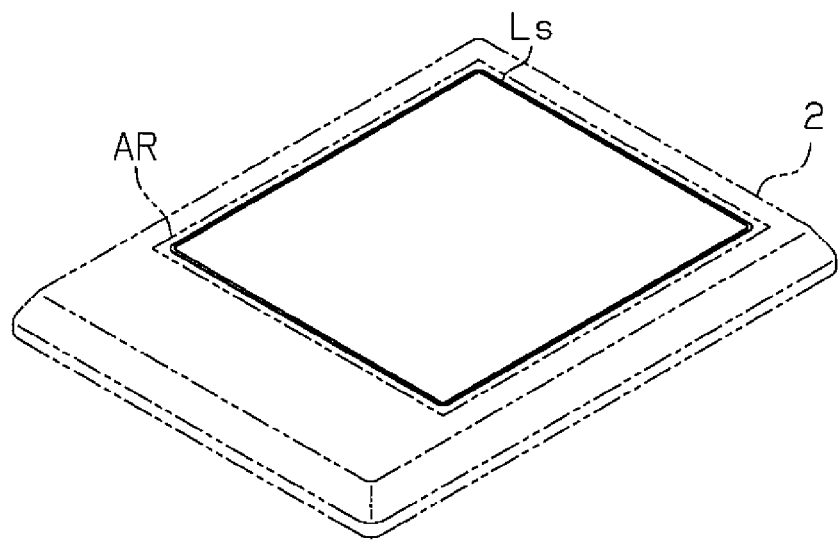
FIG. 2 is a schematic view showing a detection area of the metal detection device of the first embodiment, and a metal detection coil arranged in the detection area.

As shown in FIG. 2, a metal detection coil Ls, which is wound to have a tetragonal shape in conformance with the outer shape of the detection area AR, is arranged in the housing 2 at a position corresponding to the detection area AR. The metal detection coil Ls of the detection area AR is connected to an oscillation circuit 10 (see FIG. 3) arranged in the housing 2. The metal detection coil Ls of the detection area AR is excited by the oscillation circuit 10. The metal detection coil Ls is excited to detect whether the object OB placed in the detection area AR is a metal or a non-metal.

Furthermore, a power switch 6 is arranged on the setting surface 3. The metal detection device 1 performs detections when the power switch 6 is operated. A indication lamp 7 is also arranged on the setting surface 3. The indication lamp 7 indicates the detection result.

The electrical configuration of the metal detection device 1 will now be described.

Figure 3:
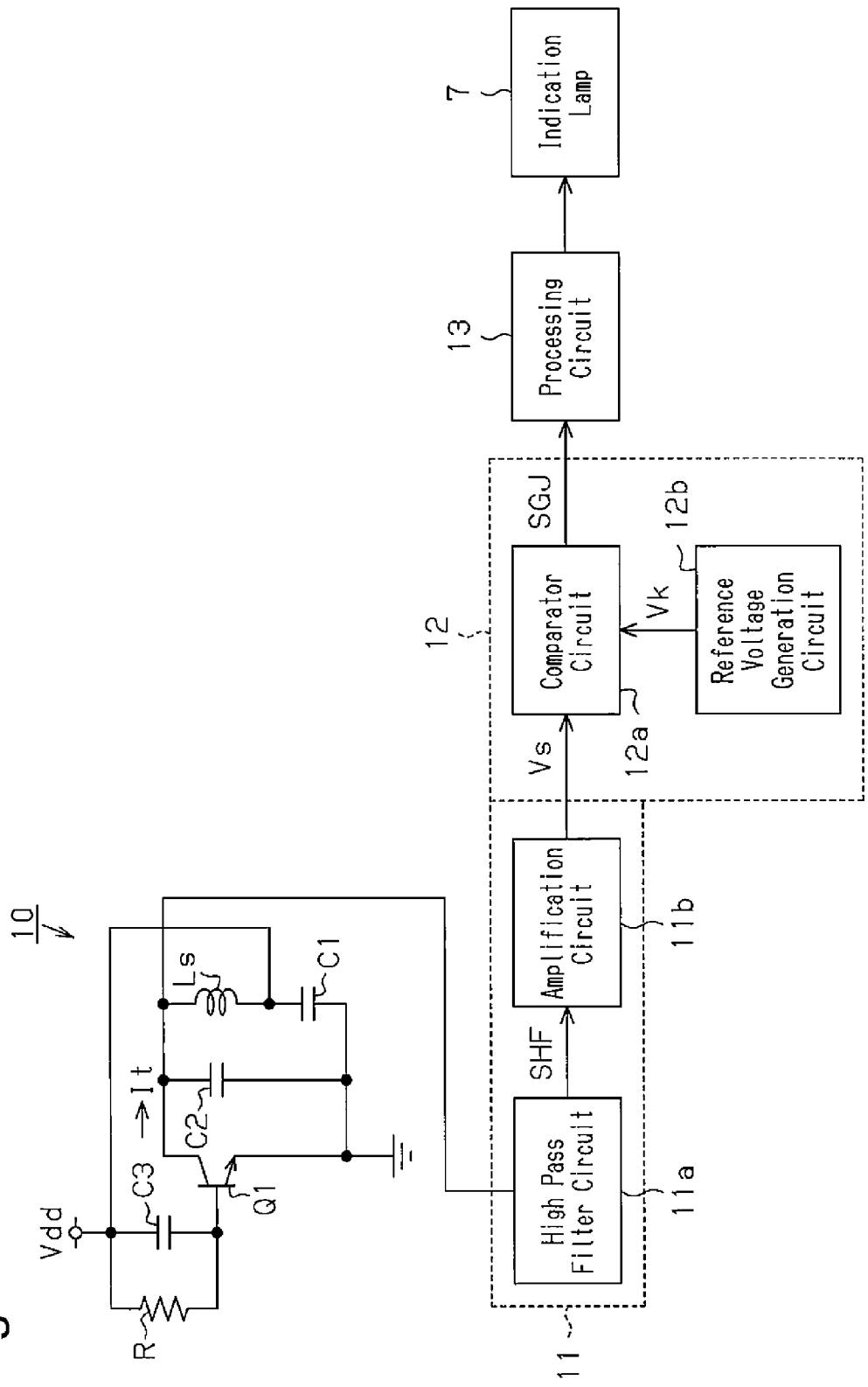
FIG. 3 is an electrical block circuit diagram of the metal detection device of the first embodiment.

As shown in FIG. 3, the metal detection device 1 includes an oscillation circuit 10, a harmonic level detection circuit 11, a comparison circuit 12, and a processing circuit 13.

In the first embodiment, the oscillation circuit 10 is configured by a Colpitts oscillation circuit, and the metal detection coil Ls also functions as one of the components configuring the oscillation circuit 10.

The oscillation circuit 10 includes a bipolar transistor Q1, the metal detection coil Ls, first to third capacitors C1 to C3, and a resistor R.

In the bipolar transistor Q1, a collector terminal is connected to one end of the metal detection coil Ls, and a base terminal is connected to a positive terminal of a DC voltage Vdd via a parallel circuit including the third capacitor C3 and the resistor R. Further, in the bipolar transistor Q1, an emitter terminal is grounded and also connected to the other end of the metal detection coil Ls via the first capacitor C1. The second capacitor C2 is connected between the collector and emitter terminals of the bipolar transistor Q1.

The other end of the metal detection coil Ls is connected to the positive terminal of the DC voltage Vdd.

When the DC voltage Vdd is applied to the oscillation circuit 10, the oscillation circuit 10 is oscillated. A sinusoidal oscillating current It having a single fundamental frequency, which is set in advance, flows from the collector terminal of the bipolar transistor Q1 to the metal detection coil Ls and excites the metal detection coil Ls. The metal detection coil Ls thus radiates a sinusoidal electromagnetic wave having the single fundamental frequency.

In detail, the single fundamental frequency oscillated by the oscillation circuit 10 is set in advance by the components configuring the oscillation circuit 10. In other words, the fundamental frequency is set in advance by a circuit constant of the bipolar transistor Q1, the metal detection coil Ls, the first to third capacitors C1 to C3, and the resistor R of the oscillation circuit 10.

The fundamental frequency is set so that when a non-metal object OB is placed on the setting surface 3, the metal detection coil Ls and the non-metal object OB oscillate, or match.

Therefore, when a non-metal object OB is placed on the setting surface 3 and the metal detection coil Ls is excited by the oscillating current It, the metal detection coil Ls and the object OB are matched. Thus, a reflected wave from the non-metal object OB to the metal detection coil Ls does not exist. As a result, the sinusoidal oscillating current It having the fundamental frequency flowing to the metal detection coil Ls is not distorted. That is, the sinusoidal oscillating current It having the fundamental frequency does not contain harmonic components (second harmonic, third harmonic, etc.) of the fundamental frequency that would result from distortion of the oscillating current It when the fundamental frequency is disturbed.

When nothing is placed in the detection area AR (when a non-metal object OB is not placed in the detection area AR), the metal detection coil Ls is not spatially coupled with the object OB, and a reflecting wave to the metal detection coil Ls does not exist. As a result, the oscillating current It flowing to the metal detection coil Ls is not distorted, and the oscillating current It does not contain harmonic components (second harmonic, third harmonic, etc.) of the fundamental frequency.

When a metal object OB is placed on the setting surface 3, metal receives the magnetic energy of the electromagnetic wave having the fundamental frequency from the metal detection coil Ls, and an eddy current is generated in the metal. The influence of magnetic flux accompanying the eddy current generated in the metal produces noise that disturbs the fundamental frequency.

Specifically, the existence of a metal results in a mismatching, and some of the energy of the electromagnetic wave radiated from the metal detection coil Ls is reflected from the metal toward the metal detection coil Ls.

Thus, the fundamental frequency of the oscillating current It is disturbed, and the oscillating current It is distorted and contains the harmonic components (second harmonic, third harmonic, etc.) of the fundamental frequency.

The harmonic components are high-order frequency components (second harmonic, third harmonic, etc.) of integral multiples of the fundamental frequency.

The harmonic level detection circuit 11 is connected to the collector terminal of the bipolar transistor Q1. The oscillating current It is supplied to the harmonic level detection circuit 11 from the collector terminal of the bipolar transistor Q1. The harmonic level detection circuit 11 includes a high pass filter circuit 11a and an amplification circuit 11b.

The oscillating current It is supplied from the collector terminal of the bipolar transistor Q1 to the high pass filter circuit 11a. The high pass filter circuit 11a removes the current component of the fundamental frequency contained in the oscillating current It, and filters the current component of the harmonic (second harmonic, third harmonic, etc.) of the fundamental frequency contained in the oscillating current It to generate a filtered signal SHF, and provides the filtered signal SHF to the amplification circuit 11b.

Specifically, the high pass filter circuit 11a provides the filtered signal SHF including the harmonic components (second harmonic, third harmonic, etc.) other than the fundamental frequency components to the amplification circuit 11b.

In detail, when nothing exists on the setting surface 3, the fundamental frequency of the oscillating current It is not be distorted. Thus, the oscillating current It does not contain harmonic components other than the fundamental frequency components, and the filtered signal SHF is not provided to the amplification circuit 11b.

In the same manner, when a non-metal object OB is placed on the setting surface 3, the fundamental frequency of the oscillating current It is not distorted. Thus, the oscillating current It does not contain harmonic components other than the fundamental frequency components, and the filtered signal SHF is not provided to the amplification circuit 11b.

When a metal object OB is placed on the setting surface 3, the fundamental frequency of the oscillating current It is disturbed, and the oscillating current It is distorted and contains harmonic components (second harmonic, third harmonic, etc.) other than the fundamental frequency components. Thus, the high pass filter circuit 11a provides the filtered signal SHF including the harmonic components (second harmonic, third harmonic, etc.) of the oscillating current It to the amplification circuit 11b.

The amplification circuit 11b is, for example, an inverted amplification circuit, a non-inverted amplification circuit, and the like. When a metal object OB is placed on the setting surface 3, the amplification circuit 11b amplifies the filtered signal SHF including the harmonic components (second harmonic, third harmonic, etc.) at a gain set in advance, and provides the filtered signal SHF to the comparison circuit 12 as a detection voltage Vs.

The comparison circuit 12 includes a comparator circuit 12a, which is formed by an operational amplifier, and a reference voltage generation circuit 12b. In the comparator circuit 12a, the detection voltage Vs is supplied to one input terminal from the amplification circuit 11b, and a reference voltage Vk is supplied to the other input terminal from the reference voltage generation circuit 12b.

The reference voltage Vk is a voltage at which the detection voltage Vs can be detected in the comparator circuit 12a when a metal object OB is placed on the setting surface 3. The reference voltage Vk is set in advance based on experiments, tests, calculations, and the like.

The comparator circuit 12a compares the detection voltage Vs and the reference voltage Vk. When the detection voltage Vs is greater than or equal to the reference voltage Vk, the comparator circuit 12a provides a determination signal SGJ having high level, which indicates that a metal object OB is placed in the detection area AR, to the processing circuit 13. In contrast, when the detection voltage Vs is lower than the reference voltage Vk, the comparator circuit 12a provides the determination signal SGJ having a low level, which indicates that a metal object OB is not placed in the detection area AR, to the processing circuit 13.

The processing circuit 13 is configured by a microcomputer. The determination signal SGJ is provided from the comparator circuit 12a to the processing circuit 13. When the determination signal SGJ having a high level is provided to the processing circuit 13, the processing circuit 13 continuously illuminates the indication lamp 7 arranged on the setting surface 3 in red. This allows for visual recognition of a metal object OB placed on the setting surface 3.

In contrast, when the determination signal SGJ having a low level is provided to the processing circuit 13, the processing circuit 13 continuously illuminates the indication lamp 7 in blue. This allows for visual recognition of a non-metal object OB placed on the setting surface 3 or nothing placed on the setting surface 3.

The operation of the metal detection device 1 will now be described.

When nothing exists on the setting surface 3 and the power switch 6 arranged on the setting surface 3 is switched ON, the DC voltage Vdd is applied to the oscillation circuit 10. This oscillates the oscillation circuit 10. The oscillating current It having the fundamental frequency then flows from the collector terminal of the bipolar transistor Q1 to the metal detection coil Ls, thus exciting the metal detection coil Ls.

When nothing exists on the setting surface 3, the fundamental frequency of the oscillating current It is not disturbed, and the oscillating current It does not contain harmonic components other than the fundamental frequency components. Thus, the oscillating current It of the fundamental frequency component is removed by the high pass filter circuit 11a, and the filtered signal SHF is not provided to the amplification circuit 11b.

Therefore, the amplification circuit 11b supplies the comparator circuit 12a with the detection voltage Vs that is lower than the reference voltage Vk. As a result, the comparator circuit 12a provides the determination signal SGJ having a low level, which indicates that the metal object OB is not placed in the detection area AR, to the processing circuit 13. The processing circuit 13 then continuously illuminates the indication lamp 7 in blue in response to the determination signal SGJ having a low level, so that it can be visually recognized that nothing exists on the setting surface 3.

A case in which a non-metal object OB is placed on the setting surface 3 will now be described.

In this case, the fundamental frequency of the oscillating current It is not disturbed, and hence the oscillating current It does not contain harmonic components other than the fundamental frequency components like when nothing exists on the setting surface 3. Thus, the oscillating current It of the fundamental frequency component is removed by the high pass filter circuit 11a, and the filtered signal SHF is not provided to the amplification circuit 11b.

Accordingly, in the same manner, the processing circuit 13 continuously illuminates the indication lamp 7 in blue so that the non-metal object OB placed on the setting surface 3 can be visually recognized.

A case in which a metal object OB is placed on the setting surface 3 will now be described.

In this case, the fundamental frequency of the oscillating current It is disturbed, and the oscillating current It is distorted and contains the harmonic components (second harmonic, third harmonic, etc.) other than the fundamental frequency components. Thus, the high pass filter circuit 11a provides the filtered signal SHF including the harmonic components (second harmonic, third harmonic, etc.) other than the fundamental frequency components to the amplification circuit 11b. The detection voltage Vs having a voltage value greater than the reference voltage Vk is supplied from the amplification circuit 11b to the comparator circuit 12a. The comparator circuit 12a provides the determination signal SGJ having a high level, which indicates that a metal object OB exists in the detection area AR, to the processing circuit 13. The processing circuit 13 continuously illuminates the indication lamp 7 in red in response to the determination signal SGJ having a high level so that the metal object OB placed on the setting surface 3 can be visually recognized.

The first embodiment has the following advantages.

(1) The oscillation circuit 10 excites the metal detection coil Ls with the sinusoidal oscillating current It having the single fundamental frequency. The metal detection coil Ls radiates the sinusoidal electromagnetic wave having the single fundamental frequency.

The high pass filter circuit 11a removes the fundamental frequency components of the oscillating current It and filters the harmonic components of the fundamental frequency of the oscillating current It.

Whether or not the metal object OB is placed on the setting surface 3 is determined based on of whether or not the present oscillating current It flowing to the metal detection coil Ls is distorted.

Specifically, compared to the prior art that determines whether an object OB is made of a metal or a non-metal based on whether the amplitude value of the oscillating current It is large or small, it is determined whether an object OB is made of a metal or a non-metal based on the frequency component of the oscillating current It. Therefore, the detection of whether an object OB is made of a metal or a non-metal is performed with high accuracy.

(2) The indication lamp 7 is arranged on the setting surface 3 so that the detection result on whether an object OB is made of a metal or a non-metal is visually recognized from the illumination of the indication lamp 7. This allows for immediate determination of whether the object OB is made of a metal or a non-metal.

Second Embodiment

A contactless power supplying device according to a second embodiment of the present invention will now be described with reference to the drawings. The feature of the second embodiment is in that the metal detection device of the first embodiment is applied to a contactless power supplying device. The feature will be described in detail, and portions that are the same as the first embodiment will be illustrated with the same reference numerals for the sake of convenience.

Figure 4:
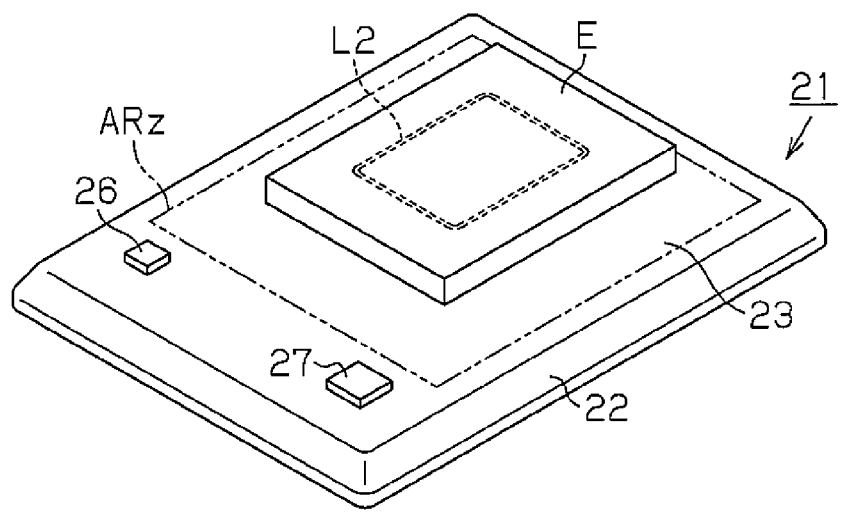
FIG. 4 is a perspective view entirely showing a contactless power supplying device and an electric instrument of a second embodiment.

FIG. 4 is a perspective view entirely showing a contactless power supplying device (hereinafter referred to as the power supplying device) 21 and an electric instrument (hereinafter referred to as the instrument) E that is supplied with power in a contactless manner from the power supplying device 21.

The power supplying device 21 includes a tetragonal plate-shaped housing 22 and a planar setting surface 23, which is formed on an upper surface of the housing 22. The instrument E is placed on the setting surface 23. A single tetragonal power supplying area ARz is defined in the setting surface 23.

Figure 5:
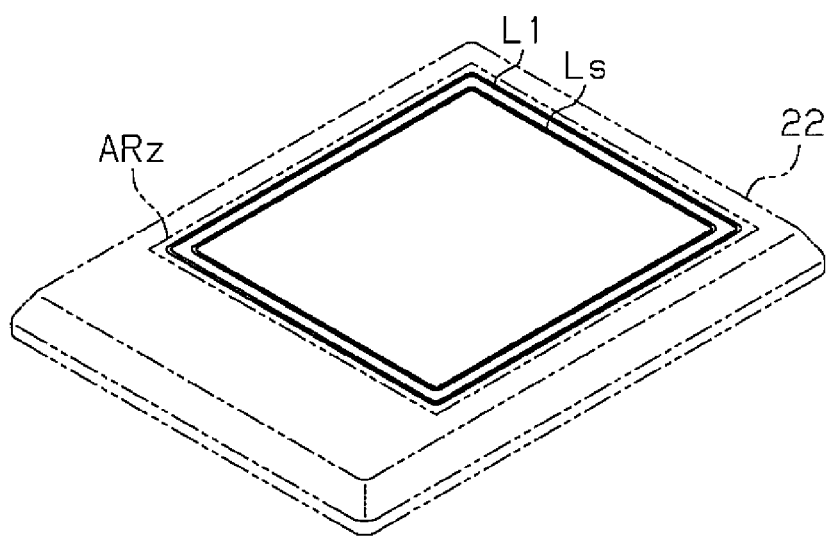
FIG. 5 is a schematic view showing a power supplying area of the second embodiment and the layout of a primary coil and a detection coil arranged in the power supplying area.

As shown in FIG. 5, a primary coil L1, which is wound to have a tetragonal shape in conformance with the outer shape of the detection area ARz, is arranged in the housing 22 at a position corresponding to the detection area ARz. The primary coil L1 is connected to a power supplying unit circuit 34 (see FIG. 6) arranged in the housing 22. The primary coil L1 is excited by the power supplying unit circuit 34.

The primary coil L1 is excited to detect whether or not the instrument E is placed in the power supplying area ARz and to cause electromagnetic induction at a secondary coil L2 in the instrument E to supply the instrument E with power in a contactless manner.

A metal detection coil Ls, which is wound to have a tetragonal shape in conformance with the outer shape of the primary coil L1, is arranged at the inner side of the primary coil L1 at a position corresponding to the power supplying area ARz. The metal detection coil Ls is connected to the oscillation circuit 10 (see FIG. 6), which is arranged in the housing 22. The metal detection coil Ls of the power supplying area ARz is excited by the oscillation circuit 10. The metal detection coil Ls is excited to detect whether or not a metal object OB has been placed in the power supplying area ARz.

A power switch 26 is also arranged on the setting surface 23. The contactless power supplying device 21 can supply power in a contactless manner when the power switch 26 is operated. A indication lamp 27 is also arranged on the setting surface 23. The indication lamp 27 indicates the operation state of the contactless power supplying device 21.

The electrical configuration of the power supplying device 21 and the instrument E will now be described with reference to FIG. 6.

Instrument E

First, the instrument E will be described. As shown in FIG. 6, the instrument E includes a power receiving circuit 28, which serves as a power receiving device that receives secondary power from the power supplying device 21, and a load Z. The power receiving circuit 28 includes a rectifying circuit 28a and a communication circuit 28b.

The rectifying circuit 28a is connected to the secondary coil L2 via a resonance capacitor Cx. In the secondary coil L2, electromagnetic induction, which results from the excitation of the primary coil L1 of the power supplying device 21, generates secondary power. The rectifying circuit 28a converts the secondary power, which is generated in the secondary coil L2, to a ripple-free DC voltage. The rectifying circuit 28a supplies the DC voltage to the load Z of the instrument E.

The load Z is driven using the secondary power generated be the secondary coil L2. For example, the instrument E may use the DC power converted by the rectifying circuit 28a to drive the load Z on the setting surface 23. Alternatively, the instrument E may use AC power as the secondary power to drive the load Z on the setting surface 23. The instrument E may also charge a built-in rechargeable battery (secondary battery) using the DC power supply converted by the rectifying circuit 28a.

The communication circuit 28b uses the DC voltage from the rectifying circuit 28a as a drive source. The communication circuit 28b generates an instrument authentication signal ID and an excitation request signal RQ, and transmits the signals to the power supplying device 21 via the secondary coil L2. The instrument authentication signal ID is an authentication signal that indicates that the instrument E is allowed to be supplied with power from the power supplying device 21. The excitation request signal RQ is a request signal that requests the power supplying device 21 to be supplied with power.

For example, when the power switch for driving the load Z arranged in the instrument E is switched OFF, the communication circuit 28b does not generate the instrument authentication signal ID and the excitation request signal RQ. Furthermore, if a microcomputer is arranged in the instrument E, the communication circuit 28b does not generate the instrument authentication signal ID and the excitation request signal RQ when the microcomputer determines to suspend the power supply.

The instrument authentication signal ID and the excitation request signal RQ include bits and are binarized (high level/low level). The instrument authentication signal ID and the excitation request signal RQ are provided to a power receiving line that connects the resonance capacitor Cx and the rectifying circuit 28a. The amplitude of the secondary current flowing to the secondary coil L2 is changed based on the instrument authentication signal ID and the excitation request signal RQ provided to the power supplying line.

The amplitude of the magnetic flux radiated from the secondary coil L2 changes in accordance with the change in amplitude of the secondary current. The changed magnetic flux is propagated to the primary coil L1 as electromagnetic induction thus changing the amplitude of the primary current flowing to the primary coil L1.

Specifically, the secondary current flowing between the terminals of the secondary coil L2 is amplitude-modulated by the binary signals (instrument authentication signal ID and excitation request signal RQ). The magnetic flux of the amplitude modulated secondary current is propagated to the primary coil L1 as a transmission signal.

Power Supplying Device 21

The power supplying device 21 will now be described. As shown in FIG. 6, the power supplying device 21 includes a power supply circuit 31, a system control circuit 32, a nonvolatile memory 33 that stores various types of data, and a power supplying unit circuit 34.

The power supply circuit 31 includes a rectifying circuit and a DC/DC converter. A commercial power supply is externally supplied to the power supply circuit 31. The power supply circuit 31 rectifies the supplied commercial power supply in the rectifying circuit. The power supply circuit 31 converts the rectified DC voltage to the desired DC voltage Vdd in the DC/DC converter, and then supplies the DC voltage Vdd to the system control circuit 32 and the nonvolatile memory 33 as the drive power supply. The power supply circuit 31 also supplies the DC voltage Vdd to the power supplying unit circuit 34 as the drive power supply.

The system control circuit 32 includes a microcomputer, and controls the power supplying unit circuit 34. The nonvolatile memory 33 stores various types of data used when the system control circuit 32 performs various determination process operations.

Figure 6:
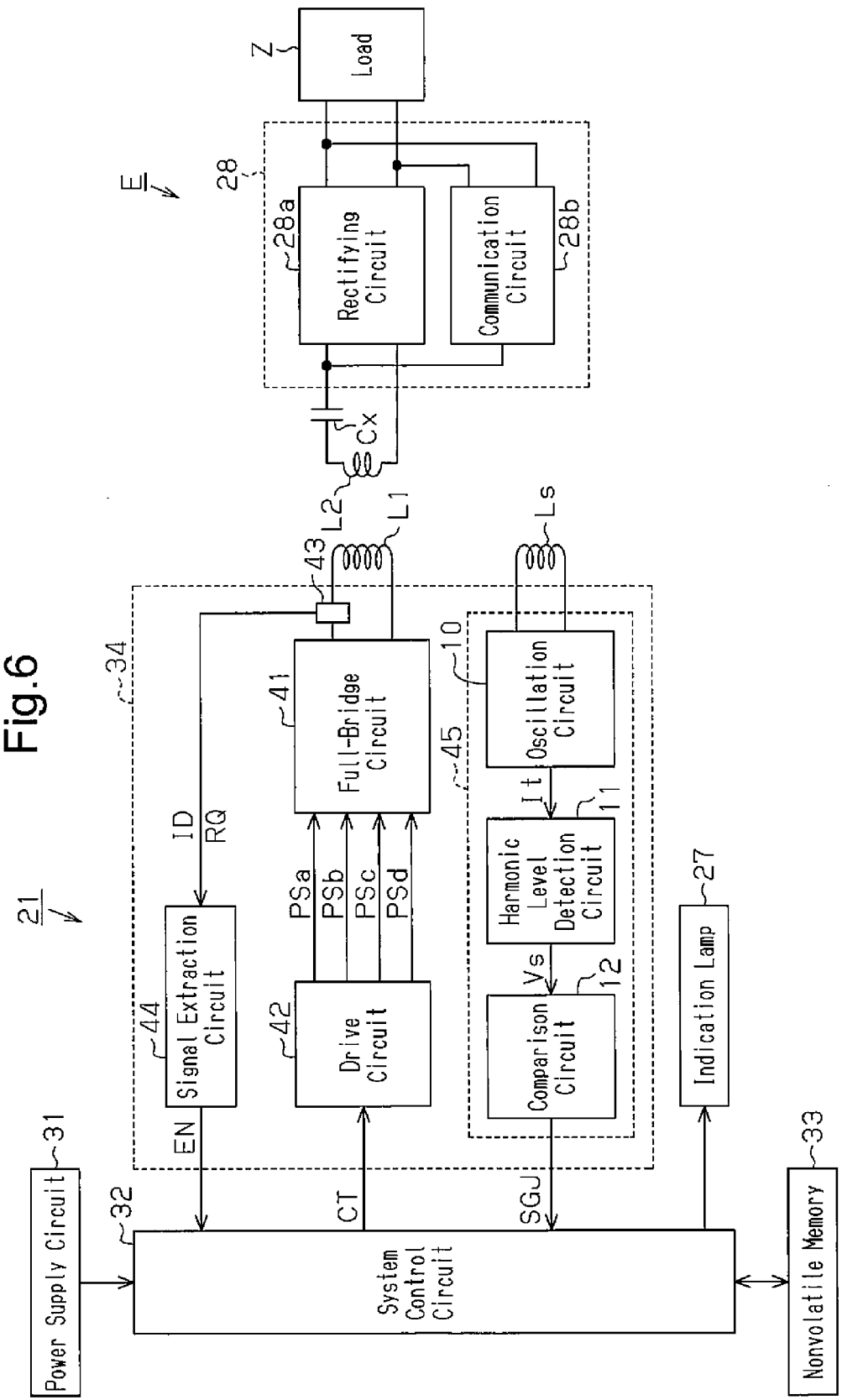
FIG. 6 is an electrical block circuit diagram of the contactless power supplying device and the electric instrument of the second embodiment.

As shown in FIG. 6, the power supplying unit circuit 34 exchanges data with the system control circuit 32, and is controlled by the system control circuit 32.

The power supplying unit circuit 34 includes a full-bridge circuit 41, a drive circuit 42, a primary current detection circuit 43, a signal extraction circuit 44, and a metal detection circuit 45.

Figure 7:
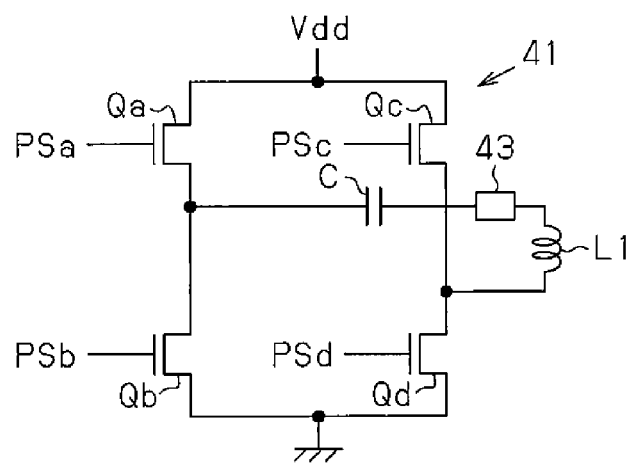
FIG. 7 is an electrical circuit diagram of the contactless power supply and a full-bridge circuit of the second embodiment.

The full-bridge circuit 41 is a known full-bridge circuit. As shown in FIG. 7, the full-bridge circuit 41 includes four N-channel MOS transistors Qa, Qb, Qc, and Qd. The four MOS transistors Qa, Qb, Qc, and Qd are divided into the pair of the MOS transistors Qa and Qd and the pair of the MOS transistors Qb and Qc are bridged by a series circuit including the primary coil L1 and the resonance capacitor C in between. The primary coil L1 is excited by alternately switching ON and OFF the two pairs.

An excitation control signal CT is provided from the system control circuit 32 to the drive circuit 42. The drive circuit 42 generates four drive signals PSa, PSb, PSc, and PSd provided to the gate terminals of the four MOS transistors Qa, Qb, Qc, and Qd, respectively.

When supplying power to the instrument E, the drive circuit 42 alternately switches ON and OFF (full-bridge operation) the two pairs based on the excitation control signal CT from the system control circuit 32 to generate the four drive signals PSa, PSb, PSc, and PSd for exciting the primary coil L1.

The drive circuit 42 provides the two drive signals PSa and PSd, which having the same pulse waveform, respectively to the two gate terminals of the MOS transistors Qa and Qd in the first pair. The drive circuit 42 also provides the two drive signals PSb and PSc, which are complementary signals of the two drive signals PSa and PSd and have the same pulse waveform, respectively to the two gate terminals of the MOS transistors Qb and Qc in the second pair.

Therefore, the primary coil L1 is excited by alternately turning ON and OFF (full-bridge operation) the first pair of the MOS transistors Qa and Qd and the second pair of the MOS transistors Qb and Qc.

When supplying power to the instrument E, the drive circuit 42 alternately switches ON and OFF (full-bridge operation) the two pairs based on the excitation control signal CT from the system control circuit 32 to generate the four drive signals PSa, PSb, PSc, and PSd for exciting the primary coil L1.

Under a standby condition, the drive circuit 42 generates the four drive signals PSa, PSb, PSc, and PSd to excite the primary coil L1 and change the operation of the full-bridge circuit 41 from the full-bridge operation to the half-bridge operation based on the excitation control signal CT from the system control circuit 32.

In the half-bridge operation, the MOS transistor Qa and the MOS transistor Qb are alternately switched ON and OFF with the MOS transistor Qd switched ON and the MOS transistor Qc switched OFF.

Therefore, the drive circuit 42 provides the drive signal PSd having a high level to the MOS transistor Qd, and the drive signal PSc having a low level to the MOS transistor Qc. The drive circuit 42 generates the two drive signals PSa and PSb, which have a complementary relationship, and respectively provides the signals to the two MOS transistors Qa and Qb so that the MOS transistor Qa and the MOS transistor Qb are alternately switched ON and OFF.

When the system control circuit 32 is providing the full-bridge circuit 41 with the excitation control signal CT to perform the full-bridge operation, the drive circuit 42 continues to provide the four drive signals PSa, PSb, PSc, and PSd. In this case, the full-bridge circuit 41 continuously excites the primary coil L1.

Furthermore, when the system control circuit 32 is providing the full-bridge circuit 41 with the excitation control signal CT to perform the half-bridge operation, the drive circuit 42 intermittently provides the four drive signals PSa, PSb, PSc, and PSd only for a predetermined period. In this case, the full-bridge circuit 41 intermittently excites the primary coil L1 in constant intervals.

In the intermittent excitation of the primary coil L1, instead of the secondary power that can sufficiently drive the load Z of the instrument E when the instrument E is placed on the setting surface 23, secondary power that can only drive the communication circuit 28b of the instrument E is supplied. Thus, the instrument E is supplied with power that allows for communication in a wireless manner with the power supplying device 21.

The primary current detection circuit 43 is arranged between one terminal of the primary coil L1 and the full-bridge circuit 41, and detects the primary current of the moment that is flowing to the primary coil L1.

The signal extraction circuit 44 is connected to the primary current detection circuit 43. While the primary coil L1 is being excited, the primary current of the primary coil L1 of the moment is supplied from the primary current detection circuit 43 to the signal extraction circuit 44. Thus, the amplitude modulated transmission signal from the secondary coil L2 of the instrument E is provided to the signal extraction circuit 44 via the primary current detection circuit 43.

The signal extraction circuit 44 extracts the instrument authentication signal ID and the excitation request signal RQ from the provided transmission signal. When extracting both signals of the instrument authentication signal ID and the excitation request signal RQ from the transmission signal, the signal extraction circuit 44 provides an enable signal EN to the system control circuit 32. When extracting only one of the instrument authentication signal ID and the excitation request signal RQ or when extracting none of the signals, the signal extraction circuit 44 does not provide the enable signal EN to the system control circuit 32.

In the same manner as the first embodiment, the metal detection circuit 45 includes the oscillation circuit 10, the harmonic level detection circuit 11, and the comparison circuit 12.

The oscillation circuit 10 is configured by a Colpitts oscillation circuit and also uses the metal detection coil Ls as one of the components configuring the oscillation circuit 10. As shown in FIG. 3, in the same manner as the first embodiment, the oscillation circuit 10 includes the bipolar transistor Q1, the metal detection coil Ls, the first to third capacitors C1 to C3, and the resistor R.

When the DC voltage Vdd is applied to the oscillation circuit 10, the oscillation circuit 10 is oscillated. A sinusoidal oscillating current It having a single fundamental frequency, which is set in advance, flows from the collector terminal of the bipolar transistor Q1 to the metal detection coil Ls. This excites the metal detection coil Ls. The metal detection coil Ls thus radiates a sinusoidal electromagnetic wave having the single fundamental frequency.

In detail, the single fundamental frequency oscillated by the oscillation circuit 10 is set in advance by the circuit constant of the components configuring the oscillation circuit 10, that is, the bipolar transistor Q1, the metal detection coil Ls, the first to third capacitors C1 to C3, and the resistor R.

The fundamental frequency of the second embodiment is set so that when the instrument E is placed on the setting surface 23, the metal detection coil Ls and the secondary coil L2 of the instrument L2 resonate, that is, match.

Therefore, when the instrument E is placed on the setting surface 23, the oscillation circuit 10 and the secondary coil L2 of the instrument E are matched. Thus, a reflected wave from the instrument E to the metal detection coil Ls does not exist. As a result, the oscillating current It flowing to the metal detection coil Ls is not distorted. Thus, the fundamental frequency of the oscillating current It is not disturbed, and the oscillating current It does not contain harmonic components (second harmonic, third harmonic, etc.) other than the fundamental frequency components.

When nothing is placed in the power supplying area ARz (when the instrument E is not placed in the power supplying area ARz), the metal detection coil Ls is not spatially coupled with the instrument E and the reflected wave to the metal detection coil Ls does not exist. As a result, the fundamental frequency of the oscillating current It flowing to the metal detection coil Ls is not disturbed, and the oscillating current It thus does not contain harmonic components (second harmonic, third harmonic, etc.) other than the fundamental frequency components.

When a metal object OB is placed on the setting surface 3, the metal receives magnetic energy of the electromagnetic wave having the fundamental frequency from the metal detection coil Ls, and an eddy current is generated in the metal. The influence of magnetic flux accompanying the eddy current generated in the metal produces noise that disturbs the fundamental frequency.

In this manner, mismatching occurs due to the existence of the metal, and come of the energy of the electromagnetic wave radiated from the metal detection coil Ls is reflected from the metal toward the metal detection coil Ls.

Thus, the fundamental frequency of the oscillating current It is disturbed, and the oscillating current It is distorted and contains the harmonic components (second harmonic, third harmonic, etc.) other than the fundamental frequency components.

As shown in FIG. 3, the harmonic level detection circuit 11 includes the high pass filter circuit 11a and the amplification circuit 11b. The high pass filter circuit 11a is connected to the collector terminal of the bipolar transistor Q1. The oscillating current It from the collector terminal of the bipolar transistor Q1 is supplied to the high pass filter circuit 11a.

The high pass filter circuit 11a removes the current component of the fundamental frequency from the oscillating current It, and filters the current component of the harmonic of the fundamental frequency contained in the oscillating current It to generate the filtered signal SHF, and provides the filtered signal SHF to the amplification circuit 11b.

In this manner, the high pass filter circuit 11a provides the filtered signal SHF including harmonic components other than the fundamental frequency components to the amplification circuit 11b.

In detail, when nothing exists on the setting surface 23, the fundamental frequency of the oscillating current It is not disturbed. Thus, the oscillating current It does not contain harmonic components other than the fundamental frequency components. Therefore, the filtered signal SHF is not provided to the amplification circuit 11b.

In the same manner, when the instrument E is placed on the setting surface 23, the fundamental frequency of the oscillating current It is not disturbed. Thus, the oscillating current It does not contain harmonic components other than the fundamental frequency components. Therefore, the filtered signal SHF is not provided to the amplification circuit 11b.

When a metal object OB is placed on the setting surface 23, the fundamental frequency of the oscillating current It is disturbed, and the oscillating current It is distorted and contains harmonic components other than the fundamental frequency components. Thus, the high pass filter circuit 11a provides the filtered signal SHF including harmonic components of the oscillating current It to the amplification circuit 11b.

The amplification circuit 11b amplifies the filtered signal SHF at a gain, which is set in advance, and provides the filtered signal SHF to the comparator circuit 12a (see FIG. 3) of the comparison circuit 12 as the detection voltage Vs.

In the comparator circuit 12a, the detection voltage Vs is supplied to one input terminal from the amplification circuit 11b, and the reference voltage Vk is supplied to the other input terminal from the reference voltage generation circuit 12b (see FIG. 3).

The reference voltage Vk is a voltage at which the detection voltage Vs can be detected in the comparator circuit 12a when the metal object OB is placed on the setting surface 3. The reference voltage Vk is set in advance based on experiments, tests, calculations, and the like.

The comparator circuit 12a compares the detection voltage Vs and the reference voltage Vk. When the detection voltage Vs is greater than or equal to the reference voltage Vk, the comparison circuit 12 provides the determination signal SGJ having a high level, which indicates that the metal object OB is placed in the power supplying area ARz, to the system control circuit 32. In contrast, when the detection voltage Vs is lower than the reference voltage Vk, the comparison circuit 12 provides the determination signal SGJ having a low level, which indicates that a non-metal object OB is not placed in the power supplying area ARz, to the system control circuit 32.

The determination signal SGJ is provided from the comparison circuit 12 to the system control circuit 32. When the determination signal SGJ having a high level is provided to the system control circuit 32, the system control circuit 32 generates the excitation control signal CT so as not to excite the primary coil L1 and continuously illuminates the indication lamp 27 arranged on the setting surface 23 in red. This allows for visual recognition of a metal object OB placed on the setting surface 23 and non-excitation of the primary coil L1.

In contrast, when the determination signal SGJ having a low level is provided from the comparison circuit 12 to the system control circuit 32 and the enable signal EN is provided from the signal extraction circuit 44, the system control circuit 32 generates the excitation control signal CT to continuously excite the primary coil L1 and supply power to the instrument E. The system control circuit 32 also continuously illuminates the indication lamp 27 arranged on the setting surface 23 in blue. This allows for visual recognition of power being supplied to the instrument E placed on the setting surface 23.

When the determination signal SGJ having a low level is provided from the comparison circuit 12 to the system control circuit 32 and the enable signal EN is not provided from the signal extraction circuit 44, the system control circuit 32 generates the excitation control signal CT to intermittently excite the primary coil L1. The system control circuit 32 intermittently illuminates the indication lamp 27 arranged on the setting surface 23 in blue. This allows for visual recognition of the contactless power supplying device 21 being in a standby condition.

The operation of the contactless power supplying device 21 will now be described.

When the power switch 26 arranged on the setting surface 23 is switched ON and the DC voltage Vdd is applied to the oscillation circuit 10 of the metal detection circuit 45, the oscillation circuit 10 is oscillated. The oscillating current It having the fundamental frequency flows from the collector terminal of the bipolar transistor Q1 to the metal detection coil Ls. This excites the metal detection coil Ls. In the same manner as the first embodiment, the metal detection circuit 45 detects whether the object OB placed in the power supplying area ARz is a metal or a non-metal, and provides the detection result to the system control circuit 32.

When the object OB placed on the setting surface 23 is a metal, the metal detection circuit 45 (comparison circuit 12) provides the system control circuit 32 with a determination signal SGJ having a high level. The system control circuit 32 generates the excitation control signal CT so as not to excite the primary coil L1 in response to the determination signal SGJ having a high level. Thus, the primary coil L1 is not excited. The system control circuit 32 also continuously illuminates the indication lamp 27 arranged on the setting surface 23 in red.

When a metal object OB is not placed on the setting surface 23, the metal detection circuit 45 (comparison circuit 12) provides the determination signal SGJ having a low level to the system control circuit 32. The system control circuit 32 generates the excitation control signal CT to intermittently excite the primary coil L1 in response to the determination signal SGJ having a low level. This intermittently excites the primary coil L1. The system control circuit 32 then intermittently illuminates the indication lamp 27 arranged on the setting surface 23 in blue. This allows for visual recognition of the contactless power supplying device 21 being in a standby condition.

When the enable signal EN is provided from the signal extraction circuit 44, the system control circuit 32 determines that the instrument E requesting for power supply is placed in the power supplying area ARz. The system control circuit 32 generates the excitation control signal CT to continuously excite the primary coil L1, and continuously excites the primary coil L1 to supply power to the instrument E. The system control circuit 32 also continuously illuminates the indication lamp 27 arranged on the setting surface 23 in blue.

The second embodiment has the following advantage in addition to the advantages of the first embodiment.

(1) The metal detection circuit 45 detects a metal object OB based on the distortion of the oscillating current It (harmonic component of the oscillating current It). When a metal object OB is detected by the metal detection circuit 45, the system control circuit 32 stops the supply of power to the instrument E. This obviates inductive heating of the metal object OB that is placed in the power supplying area ARz.

Third Embodiment

A contactless power supplying device of a third embodiment of the present invention will now be described with reference to the drawings. The feature of the third embodiment is in that the primary coil L1 and the metal detection coil Ls of the power supplying device 21 of the second embodiment are integrated. In detail, the feature of the power supplying device 21 in the third embodiment is in that the primary coil L1 is also used as the metal detection coil Ls, and the metal detection coil Ls shown in FIG. 5 of the second embodiment is omitted. The feature will be described in detail, and portions that are the same as the first embodiment and the second embodiment will be illustrated with the same reference numerals for the sake of convenience.

Figure 8:
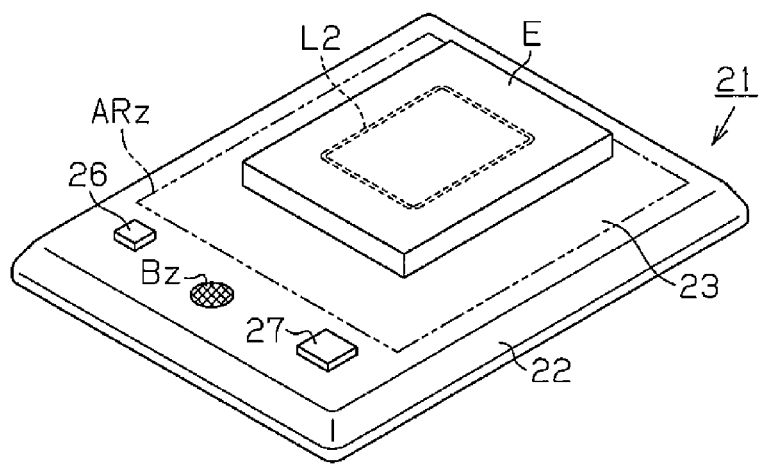
FIG. 8 is a perspective view entirely showing a contactless power supplying device and an electric instrument of a third embodiment.

As shown in FIG. 8, the power supplying device 21 includes the tetragonal plate-shaped housing 22 and the planar setting surface 23, which is formed on the upper surface of the housing 22. The instrument E is placed on the setting surface 23. One tetragonal power supplying area ARz is defined in the setting surface 23.

Figure 9:
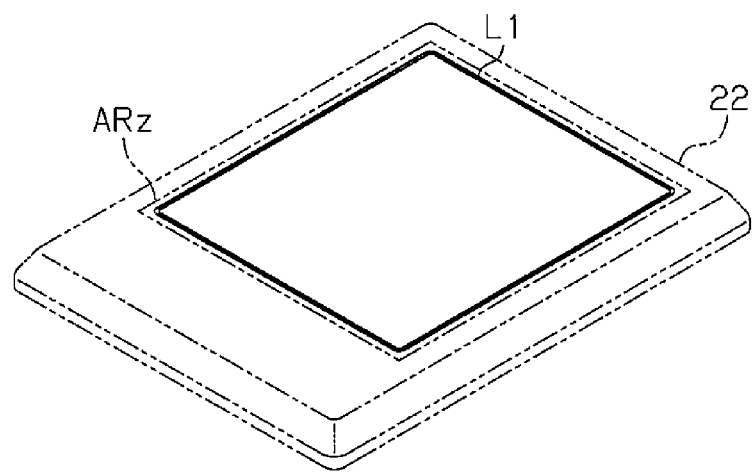
FIG. 9 is a schematic view showing a power supplying area of the third embodiment and the layout of a primary coil arranged in the power supplying area.

As shown in FIG. 9, the primary coil L1 wound to a tetragonal shape in accordance with the outer shape of the power supplying area ARz is arranged at a position corresponding to the power supplying area ARz in the housing 22. The primary coil L1 is connected to a class E amplification circuit 50 (see FIG. 10) arranged in the housing 22. The primary coil L1 is excited by the class E amplification circuit 50.

The power switch 26 is arranged on the setting surface 23. The power supplying device 21 is supplied with power in a contactless manner when the power switch 26 is operated. The indication lamp 27 is arranged on the setting surface 23. The operation state of the power supplying device 21 is indicated by the indication lamp 27. Furthermore, a buzzer Bz is arranged on the setting surface 23. The buzzer Bz is driven to indicate the operation state of the power supplying device 21.

Figure 10:
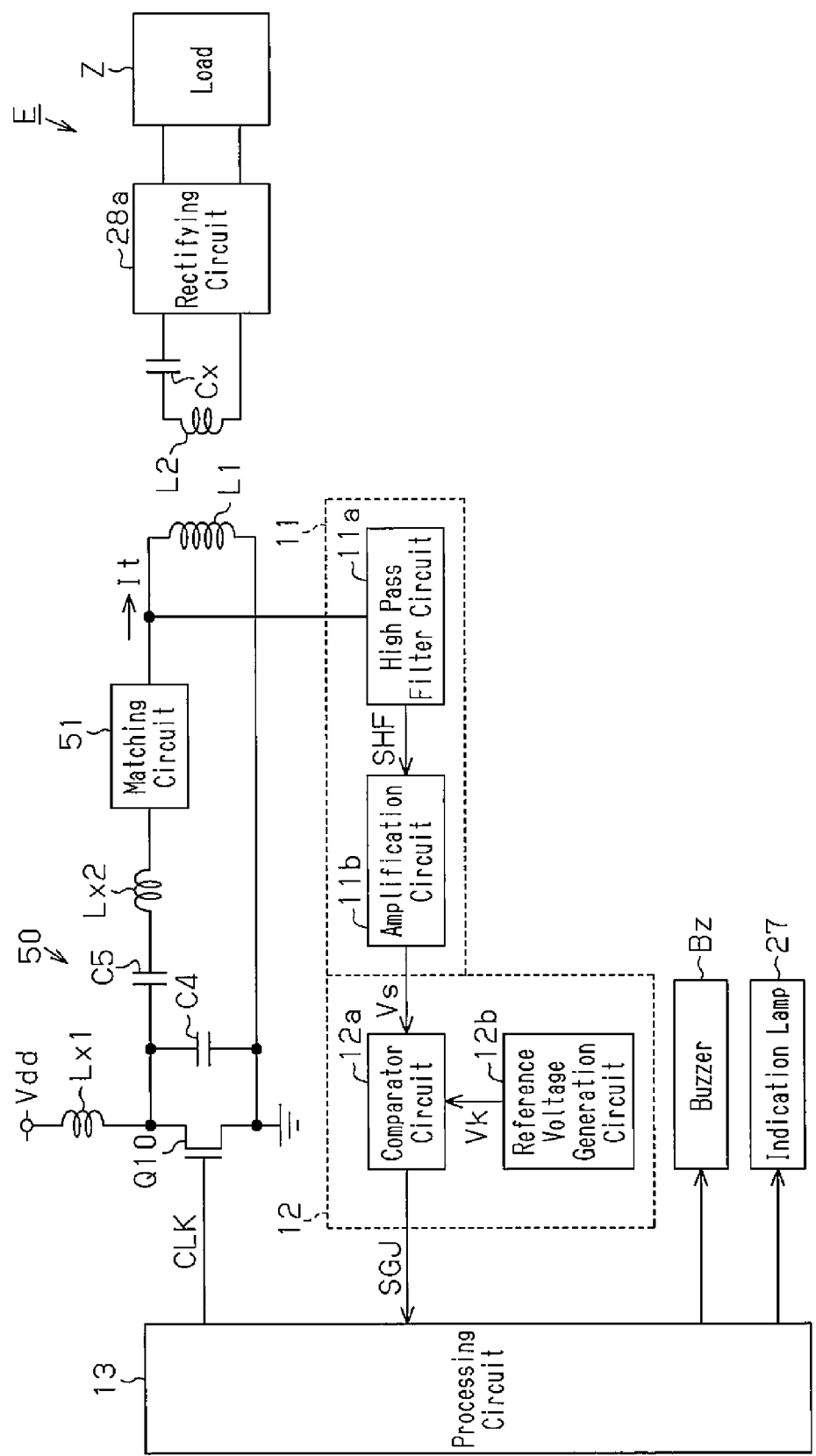
FIG. 10 is an electrical block circuit diagram of the contactless power supplying device and the electric instrument of the third embodiment.

FIG. 10 shows an electrical circuit illustrating the electrical configuration of the power supplying device 21 in the present embodiment.

The processing circuit 13 is connected to the class E amplification circuit 50. The processing circuit 13 provides a clock signal CLK to the class E amplification circuit 50. The class E amplification circuit 50 generates the sinusoidal oscillating current It having a single fundamental frequency set in advance based on the clock signal CLK, and sends the oscillating current It to the primary coil L1.

The class E amplification circuit 50 is a known amplification circuit, and includes an N-channel MOS transistor Q10, fourth and fifth capacitors C4 and C5, first and second inductance coils Lx1 and LX2, and a matching circuit 51.

In the MOS transistor Q10, a drain terminal is connected to a positive terminal of the DC voltage Vdd via the first inductance coil L1$x$, a source terminal is grounded, and a gate terminal is connected to the processing circuit 13. The clock signal CLK is provided from the processing circuit 13 to the gate terminal of the MOS transistor Q10. The fourth capacitor C4 is connected between the drain terminal and the source terminal. Furthermore, the drain terminal of the MOS transistor Q10 is connected to one end of the primary coil L1 via the fifth capacitor C5, the second inductance coil Lx2, and the matching circuit 51. The other end of the primary coil L1 is grounded.

The MOS transistor Q10 is switched ON and OFF in response to the clock signal CLK from the processing circuit 13. The fourth and fifth capacitors C4 and C5 thus repeat charging and discharging, and the current flowing to the primary coil L1 is controlled by the first and second inductance coils Lx1 and Lx2. A sinusoidal primary current (oscillating current It) having a single fundamental frequency is supplied to the primary coil L1. The primary coil L1 is excited by the sinusoidal primary current (oscillating current It) having the single fundamental frequency, and radiates the sinusoidal electromagnetic wave having the single fundamental frequency. This causes electromagnetic induction in the secondary coil L2 of the instrument E and generates the secondary power.

The fundamental frequency of the sinusoidal oscillating current It that excites the primary coil L1 is determined in accordance with the cycle of the clock signal CLK of the processing circuit 13.

In the third embodiment, the fundamental frequency is set in advance so that when the instrument E is placed on the setting surface 23, the primary coil L1 and the secondary coil L2 of the instrument E resonate, that is, match.

Therefore, when the instrument E is placed on the setting surface 23, the primary coil L1 and the secondary coil L2 of the instrument E are matched. Thus, the reflected wave from the instrument E to the primary coil L1 does not exist. As a result, the oscillating current It flowing to the primary coil L1 is not distorted. That is, the oscillating current It does not contain harmonic components (second harmonic, third harmonic, etc.) other than the fundamental frequency components originating from the disturbance of the fundamental frequency of the oscillating current It. Thus, power is supplied with high efficiency.

When nothing is placed in the power supplying area ARz (when the instrument E is not placed in the power supplying area ARz), the primary coil L1 is not spatially coupled with the object OB and the reflected wave to the primary coil L1 does not exist. As a result, the fundamental frequency of the oscillating current It flowing to the primary coil L1 is not disturbed. Thus, the oscillating current does not contain harmonic components (second harmonic, third harmonic, etc.) other than the fundamental frequency components.

When a metal object OB is placed on the setting surface 3, the metal receives the magnetic energy of the electromagnetic wave having the fundamental frequency from the primary coil L1, and eddy current is generated in the metal.

The influence of magnetic flux accompanying the eddy current generated in the metal produces noise that disturbs the fundamental frequency.

Specifically, mismatching occurs due to the existence of the metal, and some of the energy of the electromagnetic wave radiated from the primary coil L1 is reflected from the metal toward the metal detection coil Ls.

Thus, the fundamental frequency of the oscillating current It flowing to the primary coil L1 is disturbed, and the oscillating current It is distorted and contains harmonic components (second harmonic, third harmonic, etc.) other than the fundamental frequency components.

The harmonic level detection circuit 11 is connected to one end of the primary coil L1. The oscillating current It flowing to the primary coil L1 is supplied to the harmonic level detection circuit 11.

The harmonic level detection circuit 11 includes the high pass filter circuit 11a and the amplification circuit 11b.

The high pass filter circuit 11a removes the current component of the fundamental frequency contained in the oscillating current It, filters the current component of the harmonic of the fundamental frequency contained in the oscillating current It to generate the filtered signal SHF, and provides the filtered signal SHF to the amplification circuit 11b.

The high pass filter circuit 11a provides the filtered signal SHF including harmonic components other than the fundamental frequency components to the amplification circuit 11b.

In detail, when nothing exists on the setting surface 23, the fundamental frequency of the oscillating current It is not disturbed, and the oscillating current It does not contain harmonic components other than the fundamental frequency components. Thus, the filtered signal SHF is not provided to the amplification circuit 11b.

In the same manner, when the instrument E is placed on the setting surface 23, the fundamental frequency of the oscillating current It is not disturbed, and the oscillating current It does not contain harmonic components other than the fundamental frequency components. Thus, the filtered signal SHF is not provided to the amplification circuit 11b.

When a metal object OB is placed on the setting surface 23, the fundamental frequency of the oscillating current It is disturbed. Thus, the oscillating current It contains harmonic components other than the fundamental frequency components, and the filtered signal SHF including the harmonic components is provided to the amplification circuit 11b.

The amplification circuit 11b amplifies the filtered signal SHF at a gain defined in advance, and provides the filtered signal SHF to the comparator circuit 12a of the comparison circuit 12 as the detection voltage Vs.

In the comparator circuit 12a, the detection voltage Vs is supplied to one input terminal from the amplification circuit 11b, and the reference voltage Vk is supplied to the other input terminal from the reference voltage generation circuit 12b.

The reference voltage Vk is a voltage at which the detection voltage Vs can be detected when the metal object OB is placed on the setting surface 3. The reference voltage Vk is set in advance based on experiments, tests, calculations, and the like.

The comparator circuit 12a compares the detection voltage Vs and the reference voltage Vk. When the detection voltage Vs is greater than or equal to the reference voltage Vk, the comparison circuit 12 provides the determination signal SGJ having a high level, which indicates that a metal object OB is placed in the power supplying area ARz, to the processing circuit 13. In contrast, when the detection voltage Vs is lower than the reference voltage Vk, the comparison circuit 12 provides the determination signal SGJ having a low level, which indicates that a non-metal object OB is placed in the power supplying area ARz, to the processing circuit 13.

When the determination signal SGJ having a high level is provided from the comparison circuit 12 to the processing circuit 13, the processing circuit 13 determines that a metal object OB is placed on the setting surface 3, and continuously illuminates the indication lamp 27 arranged on the setting surface 23 in red and drives the buzzer Bz. This allows the metal object OB on the setting surface 23 to be visually recognized and audibly recognized with the sound of the buzzer Bz.

In contrast, when a determination signal SGJ having a low level is provided from the comparison circuit 12 to the processing circuit 13, it is determined that a metal object OB is not placed on the setting surface 3, and the indication lamp 27 arranged on the setting surface 23 is continuously illuminated in blue. The processing circuit 13 does not produce a sound with the buzzer Bz in this case. This allows for a situation in which a metal object OB is not placed on the setting surface 23 to be visually recognized and, with the silent buzzer Bz, audibly recognized.

The operation of the power supplying device 21 will now be described.

When the power switch 26 arranged on the setting surface 23 is switched ON, the DC voltage Vdd is applied to the class E amplification circuit 50, and the processing circuit 13 provides the clock signal CLK to the class E amplification circuit 50. The class E amplification circuit 50 sends the oscillating current It having the fundamental frequency to the primary coil L1 in response to the clock signal CLK. This excites the primary coil L1.

When a metal object OB is not placed on the setting surface 23, the comparison circuit 12 provides the determination signal SGJ having a low level to the processing circuit 13. The processing circuit 13 continuously illuminates the indication lamp 27 arranged on the setting surface 23 in blue in response to the determination signal SGJ having a low level. In this case, the processing circuit 13 does not produce a sound with the buzzer Bz.

Therefore, it can be recognized that a metal object OB is not placed on the setting surface 23, and it can be determined that instrument E may be placed on the setting surface 23 and supplied with power. Thus, the indication lamp 27 continuously illuminated in blue is visually recognized, the instrument E is placed on the setting surface 23, and the instrument E is supplied with power.

In this case, since the primary coil L1 and the secondary coil L2 of the instrument E are matched, a reflected wave to the primary coil L1 does not exist, and the indication lamp 27 is continuously illuminated in blue, and the buzzer Bz does not produce a sound.

When a metal object OB is placed on the setting surface 23, the comparison circuit 12 provides a determination signal SGJ having a high level to the processing circuit 13. The processing circuit 13 continuously illuminates the indication lamp 27 in red and produces a sound with the buzzer Bz in response to the determination signal SGJ having a high level.

This allows for the recognition of a metal object OB on the setting surface 23. When the metal object OB is removed from the setting surface 23, the processing circuit 13 continuously illuminates the indication lamp 27 in blue, and stops producing a sound with the buzzer Bz.

When recognizing that the buzzer sound has stopped and visually recognizing that the indication lamp 27 is continuously illuminated in blue, the instrument E is placed on the setting surface 23 and the instrument E is supplied with power.

When a metal object OB is placed on the setting surface 23 while supplying power to the instrument E on the setting surface 23, the processing circuit 13 illuminates the indication lamp 27 in red and produces a sound with the buzzer Bz. This allows for recognition of the metal object OB on the setting surface 23 when power is being supplied. The metal object OB is then removed from the setting surface 23. When the metal object OB is removed, the processing circuit 13 continuously illuminates the indication lamp 27 in blue and stops the buzzer sound.

When recognizing that the buzzer sound has stopped and visually recognizing that the indication lamp 27 is continuously illuminated in blue, the instrument E is placed on the setting surface 23 and the supply of power to the instrument E is restarted as normal.

The third embodiment has the following advantage in addition to the advantages of the first embodiment and the second embodiment.

The primary coil L1 also serves as the metal detection coil Ls. This allows the circuit scale to be reduced in size and simplifies the structure of the entire device.

The embodiments may be modified as described below.

In the first and second embodiments, the oscillation circuit 10 is implemented by the Colpitts oscillation circuit. For example, the oscillation circuit may be implemented by the oscillation circuit that is capable of oscillating the sine wave having the single fundamental frequency such as Hartley oscillation circuit, clamp oscillation circuit, full-bridge circuit, voltage control oscillator (VCO) and the like.

In the first to third embodiments, the high pass filter circuit 11a filters all current components of the harmonic (second harmonic, third harmonic, etc.) of the fundamental frequency to generate the filtered signal SHF. For example, the high pass filter circuit may filter only the harmonic of the second harmonic for the filtered signal SHF or may filter the second harmonic and the third harmonic for the filtered signal SHF.

In the first to third embodiments, the harmonic level detection circuit 11 is implemented by the high pass filter circuit 11a and the amplification circuit 11b. The harmonic level detection circuit 11 may be implemented by a high speed Fourier transformation circuit (FFT circuit). In this case, the high speed Fourier transformation circuit extracts the harmonic component from the oscillating current It, and provides a detection signal indicating the detection level of the extracted harmonic component to the comparison circuit. The comparison circuit compares the detection level of the harmonic component and the reference value defined in advance.

When the detection level is greater than the reference value, the processing circuit 13 and the system control circuit 32 determine that a metal object OB is placed in the detection area AR or the power supplying area ARz, and metal detection may be performed like in the first to third embodiments.

In the first and second embodiments, it is assumed that the oscillation circuit 10 sends the sinusoidal oscillating current It having the single fundamental frequency to the metal detection coil Ls.

However, when it is difficult for the oscillation circuit 10 to send the sinusoidal oscillating current It strictly having the single fundamental frequency to the metal detection coil Ls, the oscillating current It contains the harmonic (hereinafter referred to as initial harmonic) components.

In such a case, a method in which the oscillation circuit 10 detects the change in the harmonic of the oscillating current It based on the reflected wave from the metal assuming the sinusoidal oscillating current It having the single fundamental frequency contains the harmonic needs to be taken into consideration.

That is, as described above, the harmonic components (this is referred to as Nth harmonic, second harmonic, third harmonic, etc.) of the single fundamental frequency is generated based on the reflected wave from the metal in the oscillating current It.

In addition, the harmonic component (this is referred to as Mth harmonic, second harmonic, third harmonic, etc.) of the initial harmonic is generated based on the reflection due to the presence or absence of metal in the oscillating current It.

The harmonic level detection circuit 11 needs to include a band pass filter circuit as a filter circuit for filtering the harmonic components of the Nth harmonic or synthetic components of the harmonic components of the Nth harmonic and the harmonic components of the Mth harmonic (N, M=2, 3, 4, . . . ).

The synthetic components of the harmonic components of the Nth harmonic and the harmonic components of the Mth harmonic (N, M=2, 3, 4, . . . ) are acquired in advance by experiments, simulations, and the like.

The signal of the second harmonic component, when metal exists, increases or decreases from the signal of the second harmonic component when metal does not exist. In this case, since the detection voltage Vs from the amplification circuit 11b is lower than or equal to the reference voltage Vk, the comparator circuit 12a generates the determination signal SGJ having a low level and the processing circuit 13 (system control circuit 32) determines that the metal exists.

It is apparent that the above may be applied to the class E amplification circuit 50 of the third embodiment even when the sinusoidal oscillating current It having the single fundamental frequency is sent to the primary coil L1.

In the second embodiment, the oscillation circuit 10 is configured by the circuit shown in FIG. 3 of the first embodiment. When the power switch 26 is switched ON and the DC voltage Vdd is applied to the oscillation circuit 10, the oscillation circuit 10 is oscillated. That is, the timing of the metal detection is started when the power switch 26 is switched ON and the DC voltage Vdd is applied to the oscillation circuit 10.

The metal detection may be performed at one of the timing of (1) from when detecting the setting of the instrument E until when starting the supply of power to the instrument E, (2) when supplying power to the instrument E, and (3) when the supply of power is suspended for a short time during the power supply.

Figure 11:
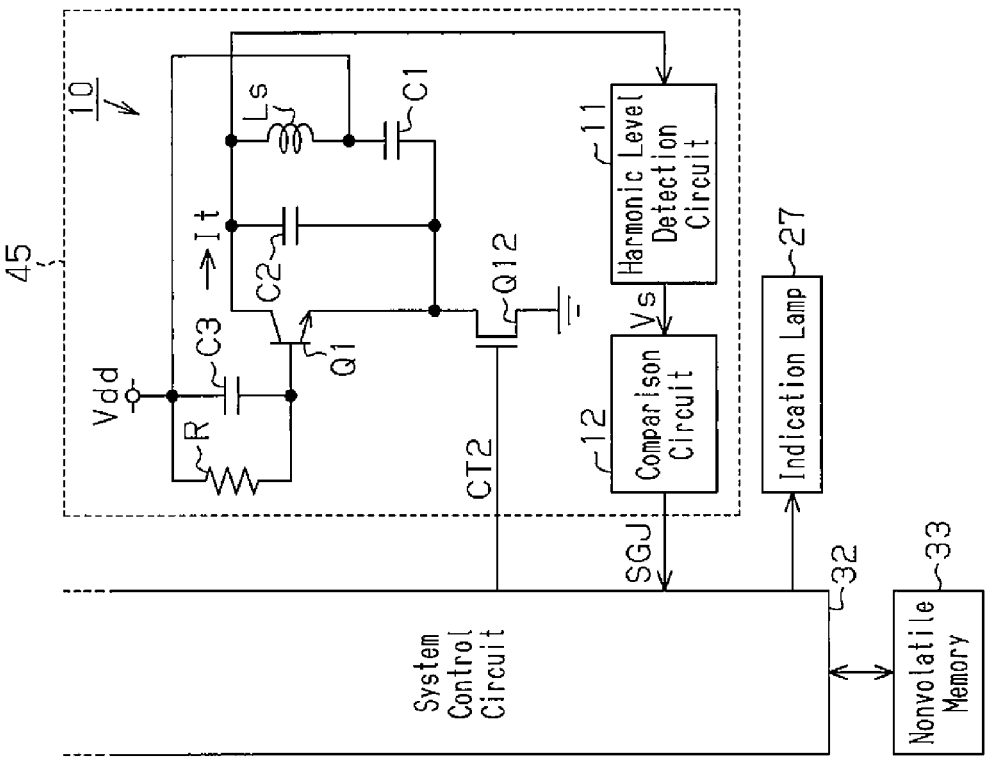
FIG. 11 is an electrical circuit diagram of a contactless power supplying device showing another example of the second embodiment.
Figure 12:
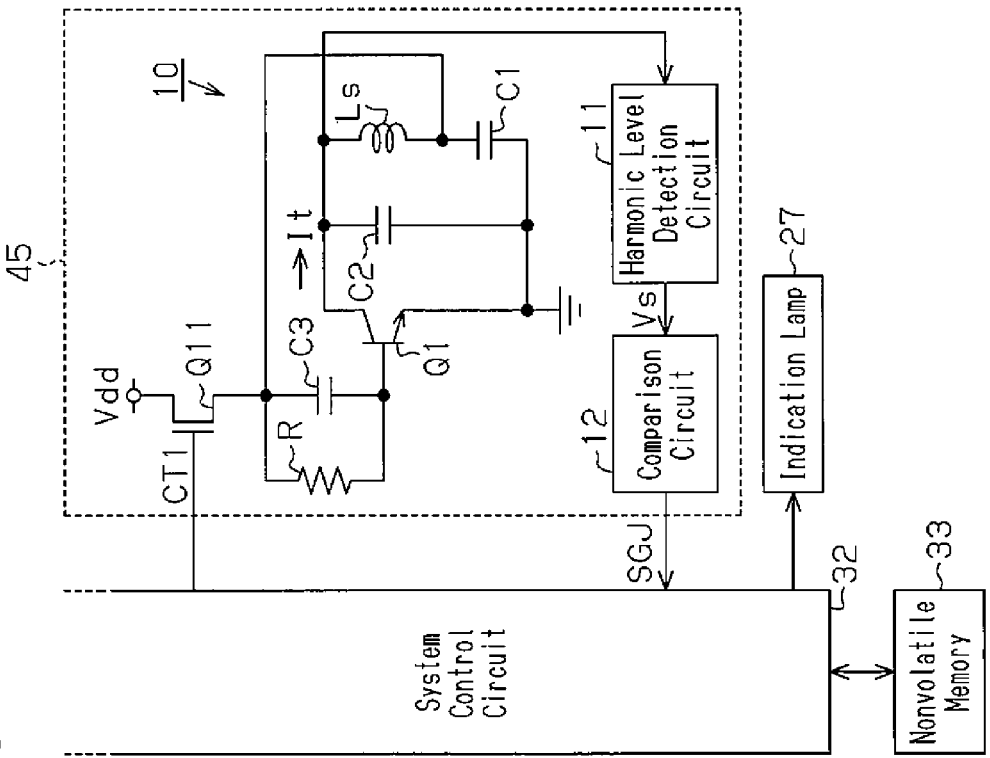
FIG. 12 is an electrical circuit diagram of the contactless power supplying device showing another example of the second embodiment.

In this case, the oscillation circuit 10 is controlled at the timing the DC voltage Vdd is applied by command signals CT1 and CT2 from the system control circuit 32, as shown in FIGS. 11 and 12.

In FIG. 11, an N-channel MOS transistor Q11 is connected between a parallel circuit, which is formed by the resistor R and the third capacitor C3, and the positive terminal of the DC voltage Vdd. The system control circuit 32 provides the command signal CT1 having a high level to the gate of the MOS transistor Q11, and oscillates the oscillation circuit 10 at one of the timings (1) to (3) to perform metal detection.

In FIG. 12, an N-channel MOS transistor Q12 is connected between the emitter terminal of the bipolar transistor Q1 and the ground. The system control circuit 32 provides the command signal CT2 having a high level to the gate of the MOS transistor Q12, and oscillates the oscillation circuit 10 at one of the above timings to perform the metal detection in the same manner.

In the second embodiment, the metal detection coil Ls is independently arranged, but the metal detection coil Ls may be omitted and used in the primary coil L1. In this case, the oscillation circuit 10 of the metal detection circuit 45 can be substituted with the full-bridge circuit 41, and the opposite detection signal of the primary current from the primary current detection circuit 43 is provided to the harmonic level detection circuit 11 as the oscillating current It. Therefore, the circuit scale of the contactless power supplying device 21 can be reduced.

The second embodiment includes a single power supplying area ARz, and a single primary coil L1 and a single metal detection coil Ls in a single power supplying area ARz.

Figure 13:
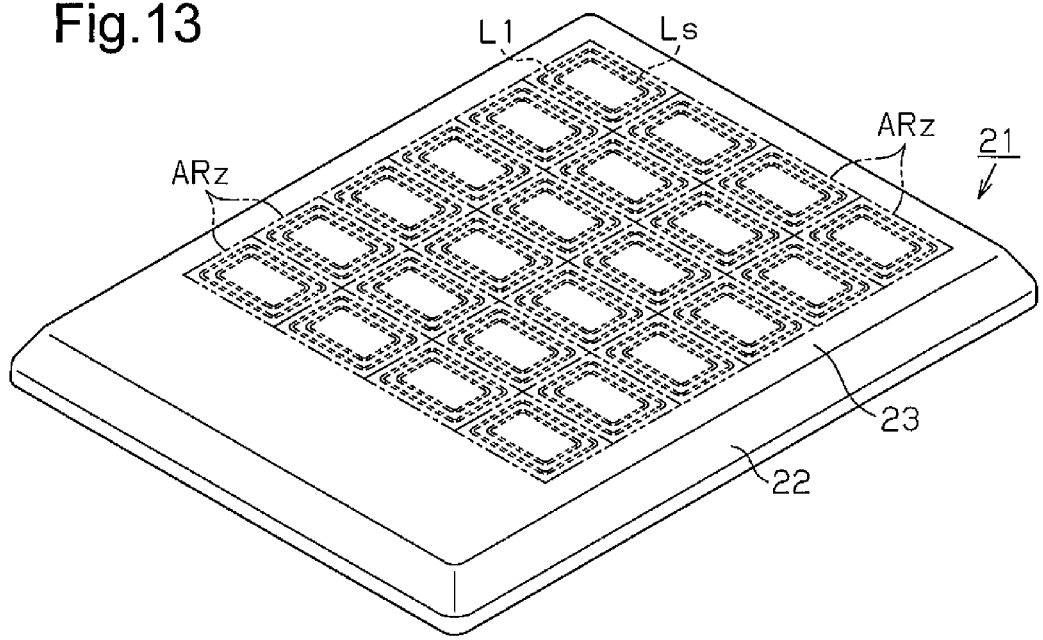
FIG. 13 is a perspective view entirely showing another example of the contactless power supplying device.

As shown in FIG. 13, a plurality of power supplying areas ARz may be formed on the setting surface 23 of the contactless power supplying device 21. The primary coil L1 and the metal detection coil Ls may be arranged in each power supplying area ARz. In other words, the second embodiment may be applied to the contactless power supplying device 21 that can supply power to the instrument E regardless of which power supplying area ARz the instrument E is placed in, or so-called free-layout contactless power supplying device 21.

In the contactless power supplying device 21 shown in FIG. 13, the single system control circuit 32 controls all the power supplying unit circuits 34. However, a plurality of system control circuits 32 may be used for the plurality of power supplying unit circuits 34, respectively.

Figure 14:
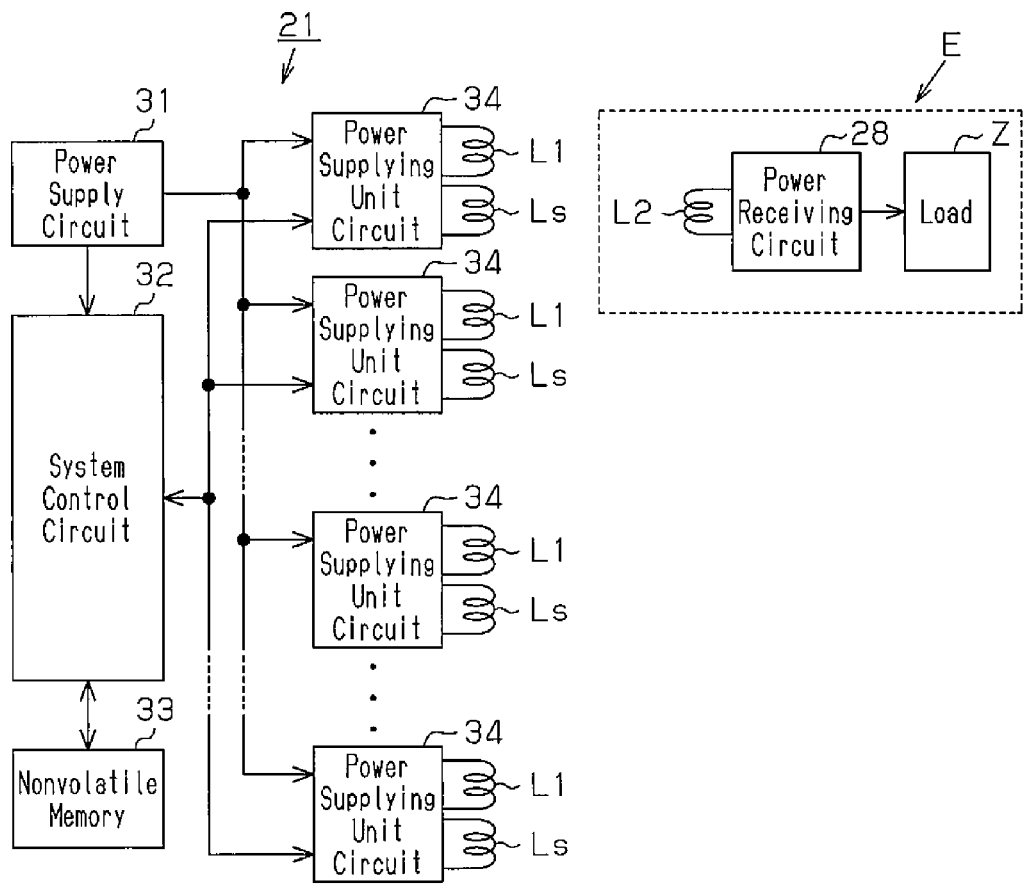
FIG. 14 is an electrical block circuit diagram of another example of the contactless power supplying device and the electric instrument.

As shown in FIG. 14, such a free-layout contactless power supplying device 21 can achieve lower cost and allow for reduction in the size of the plurality of power supplying unit circuits 34 arranged in the plurality of power supplying areas ARz and controlled by the same system control circuit 32.

Even in such a free-layout contactless power supplying device 21, the oscillation circuit 10 may control the metal detection timing with the command signals CT1 and CT2 from the system control circuit 32, as shown in FIGS. 11 and 12.

In the first and second embodiments, the indication lamp 7, 27 is used as a notification unit. However, a buzzer may be used instead. In this case, the tone of the buzzer may be changed in accordance with whether or not metal exists.

In the third embodiment, the indication lamp 27 and the buzzer Bz are used as a notification unit. Instead, only one may be used as a notification unit.

The invention claimed is:

1. A metal detection device comprising:
   a metal detection coil arranged in a metal detection area, wherein the metal detection coil is excited, and an electromagnetic wave radiated from the metal detection coil is used to detect whether or not metal exists in the metal detection area;
   an oscillation circuit that generates a sinusoidal oscillating current having a single fundamental frequency, wherein the oscillation circuit supplies the oscillating current to the metal detection coil to excite the metal detection coil;
   a harmonic level detection circuit that detects a harmonic component of the fundamental frequency component of the oscillating current and generates a detection signal;
   a comparison circuit that compares a signal level of the detection signal and a reference value, which is set in advance; and
   a processing circuit that determines whether or not metal exists in the metal detection area based on a comparison result, wherein when determining that metal exists in the metal detection area, the processing circuit drives a notification unit to issue a notification indicating detection of metal.

2. The metal detection device according to claim 1, wherein the harmonic level detection circuit includes
   a filter circuit that filters a frequency component higher than the fundamental frequency from the oscillating current to generate a filtered signal, and
   an amplification circuit that amplifies the filtered signal from the filter circuit to generate the detection signal.

3. The metal detection device according to claim 1, wherein the harmonic level detection circuit includes a high speed Fourier transformation circuit that extracts a frequency component higher than the fundamental frequency from the oscillating current to generate the detection signal.

4. The metal detection device according to claim 1, wherein the notification unit includes an indication lamp.

* * * * *